(No Model.) 8 Sheets—Sheet 1.
L. P. BUCK & F. D. SWEETEN.
PRINTING TELEGRAPH.
No. 506,973. Patented Oct. 17, 1893.
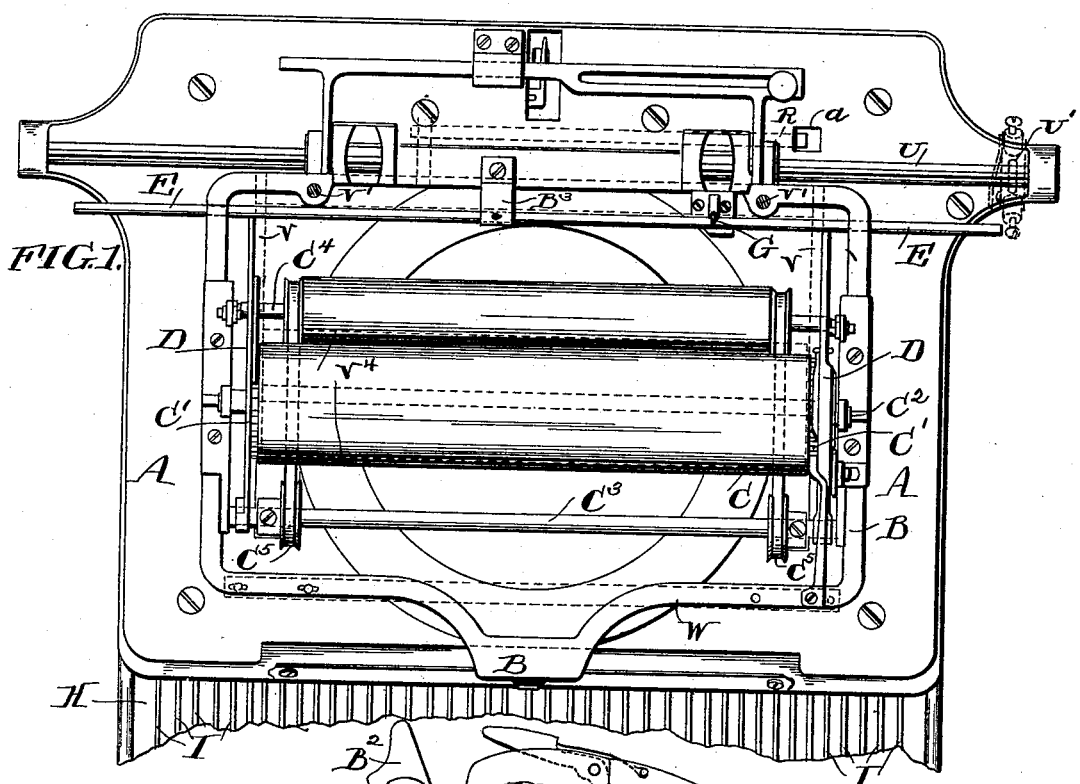
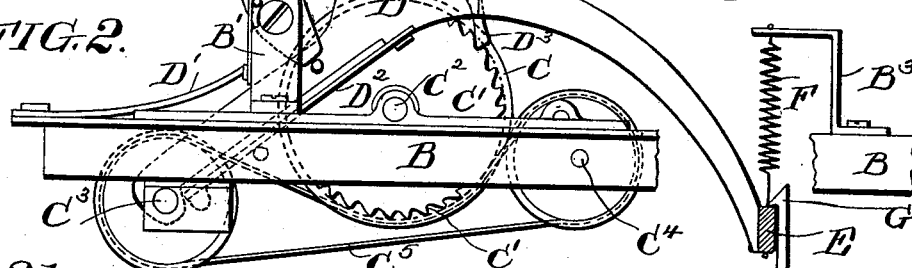
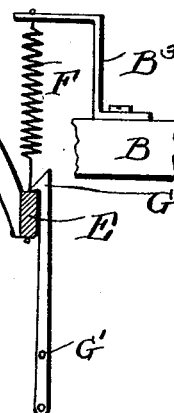
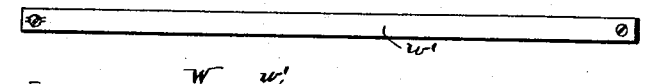
WITNESSES:  INVENTORS:

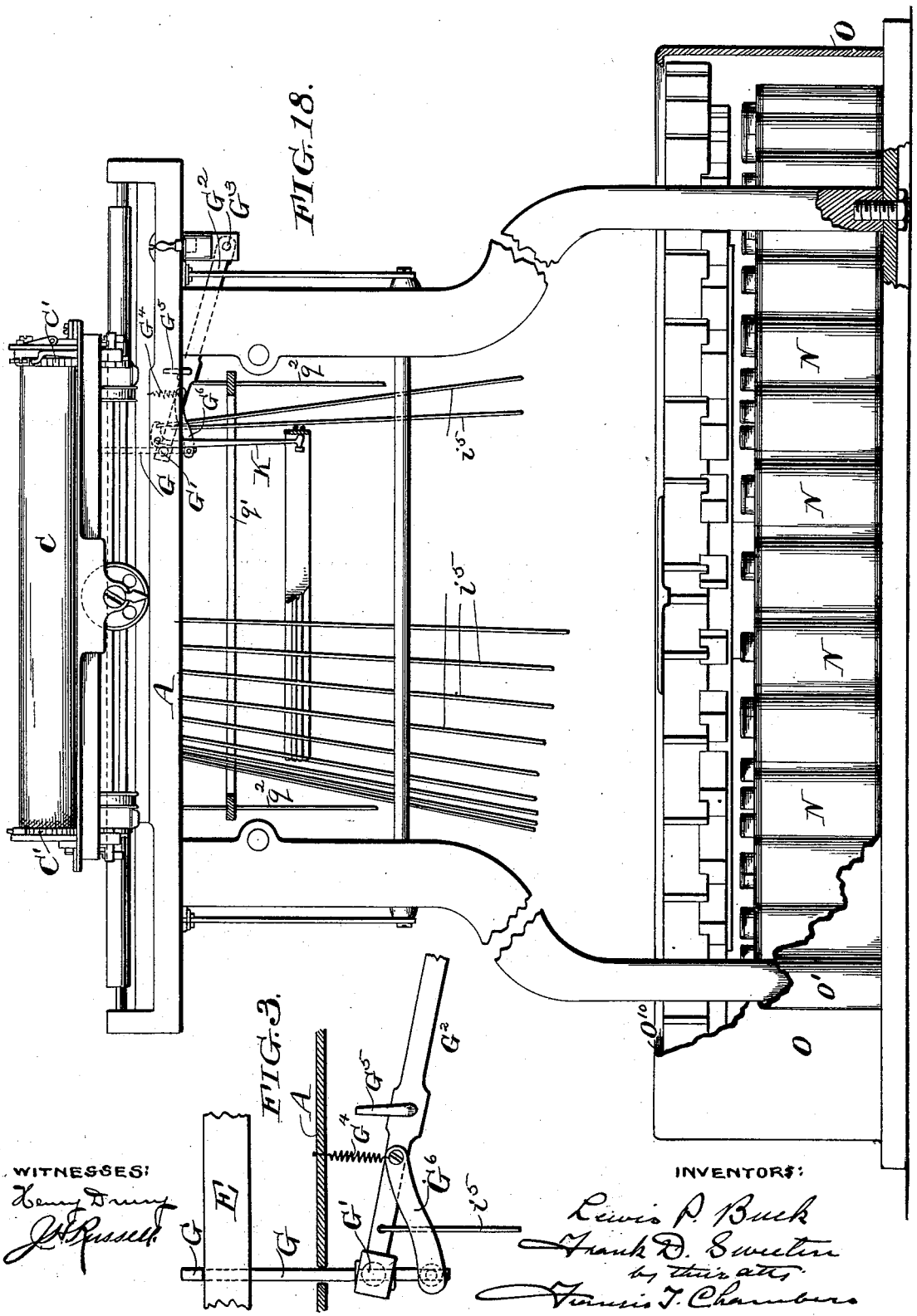

(No Model.) 8 Sheets—Sheet 3.
L. P. BUCK & F. D. SWEETEN.
PRINTING TELEGRAPH.
No. 506,973. Patented Oct. 17, 1893.
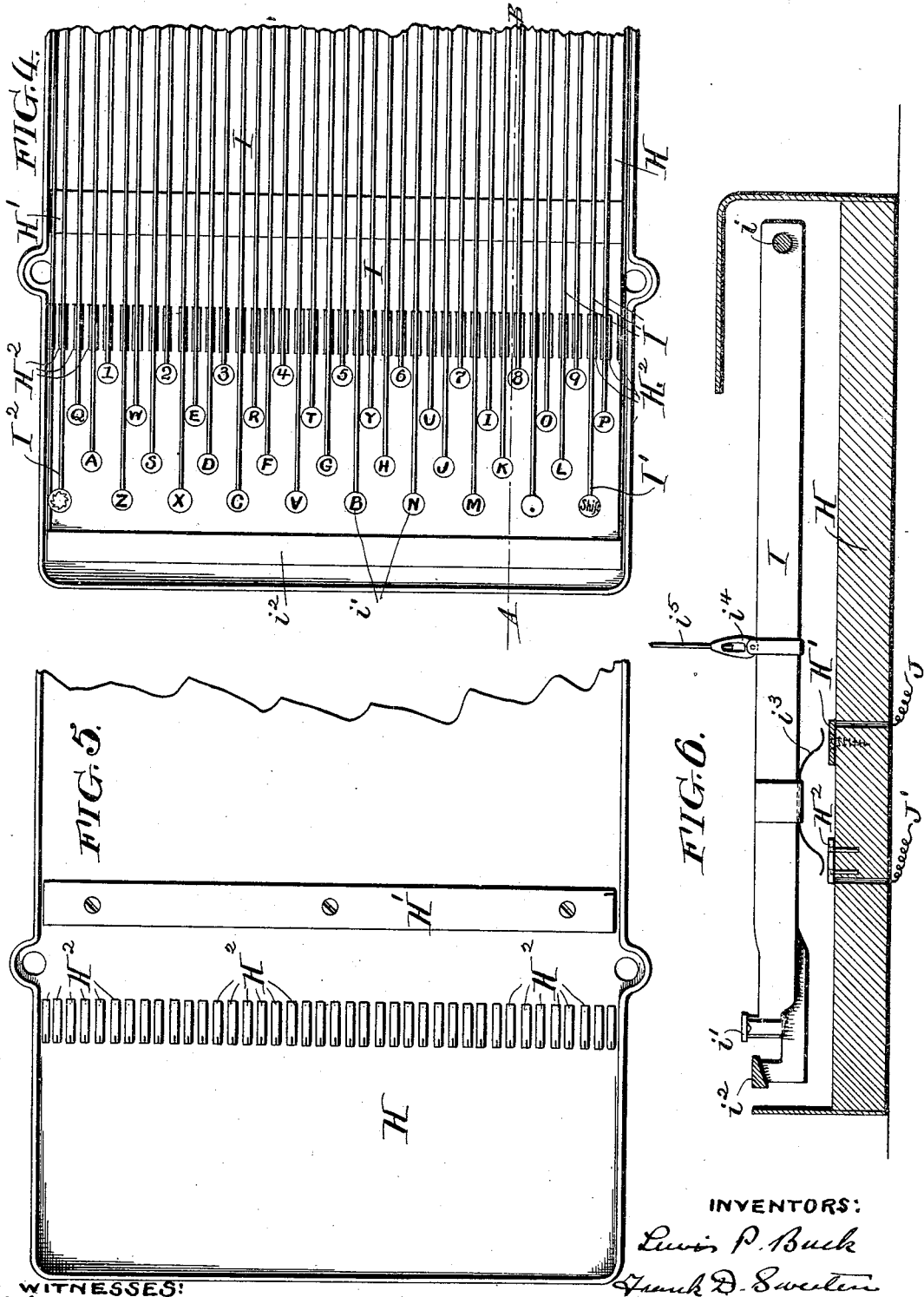

(No Model.) 8 Sheets—Sheet 4.
L. P. BUCK & F. D. SWEETEN.
PRINTING TELEGRAPH.
No. 506,973. Patented Oct. 17, 1893.
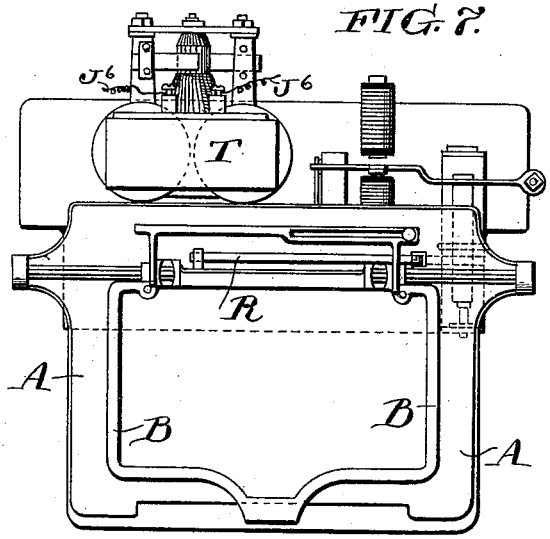
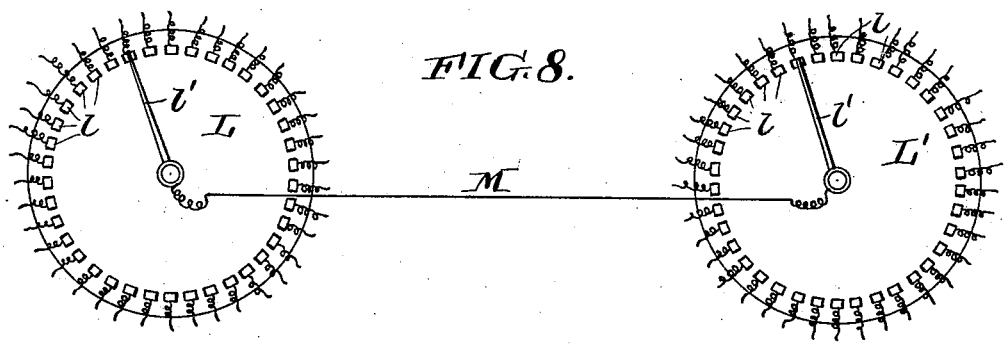

(No Model.) 8 Sheets—Sheet 5.
L. P. BUCK & F. D. SWEETEN.
PRINTING TELEGRAPH.
No. 506,973. Patented Oct. 17, 1893.
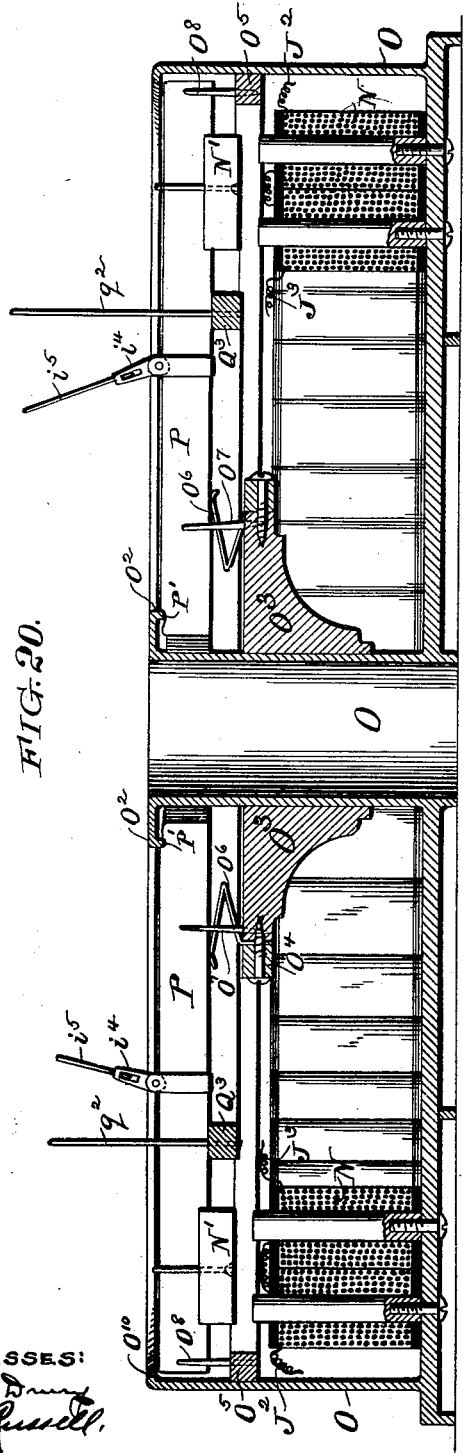
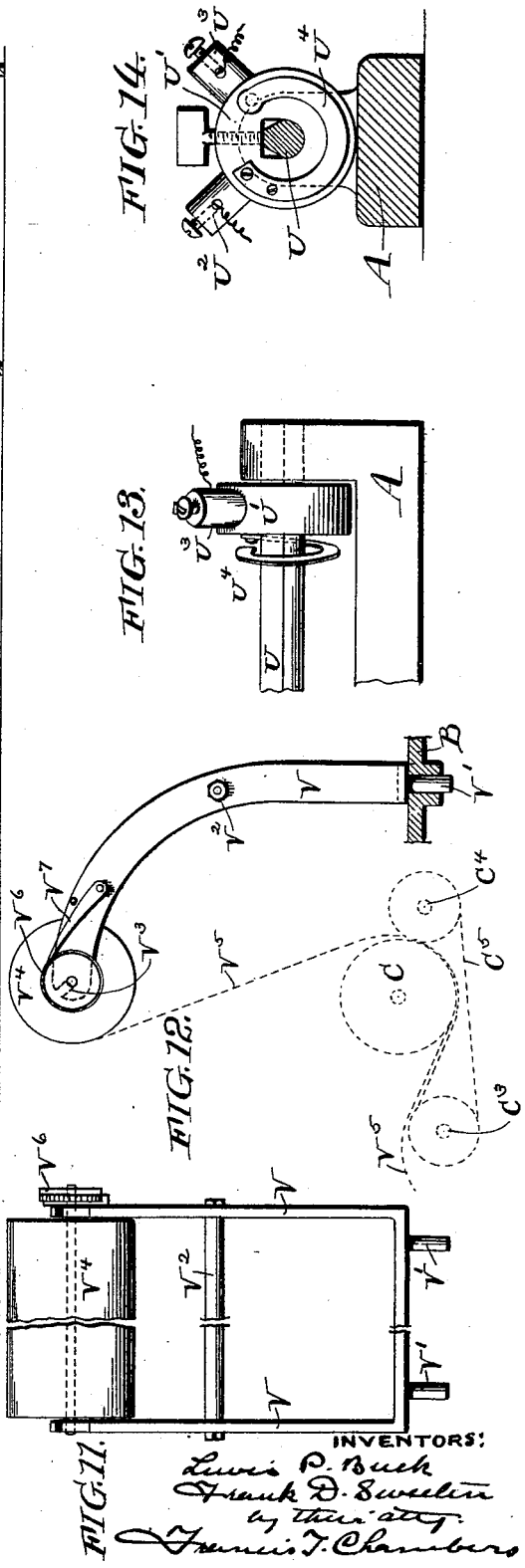
WITNESSES:
INVENTORS:
Lewis P. Buck
Frank D. Sweeten
by their atty.
Francis T. Chambers (No Model.) 8 Sheets—Sheet 6.

L. P. BUCK & F. D. SWEETEN.
PRINTING TELEGRAPH.

No. 506,973. Patented Oct. 17, 1893.

WITNESSES:

INVENTORS:
Lewis P. Buck
Frank D. Sweeten
by their atty.
Francis T. Chambers

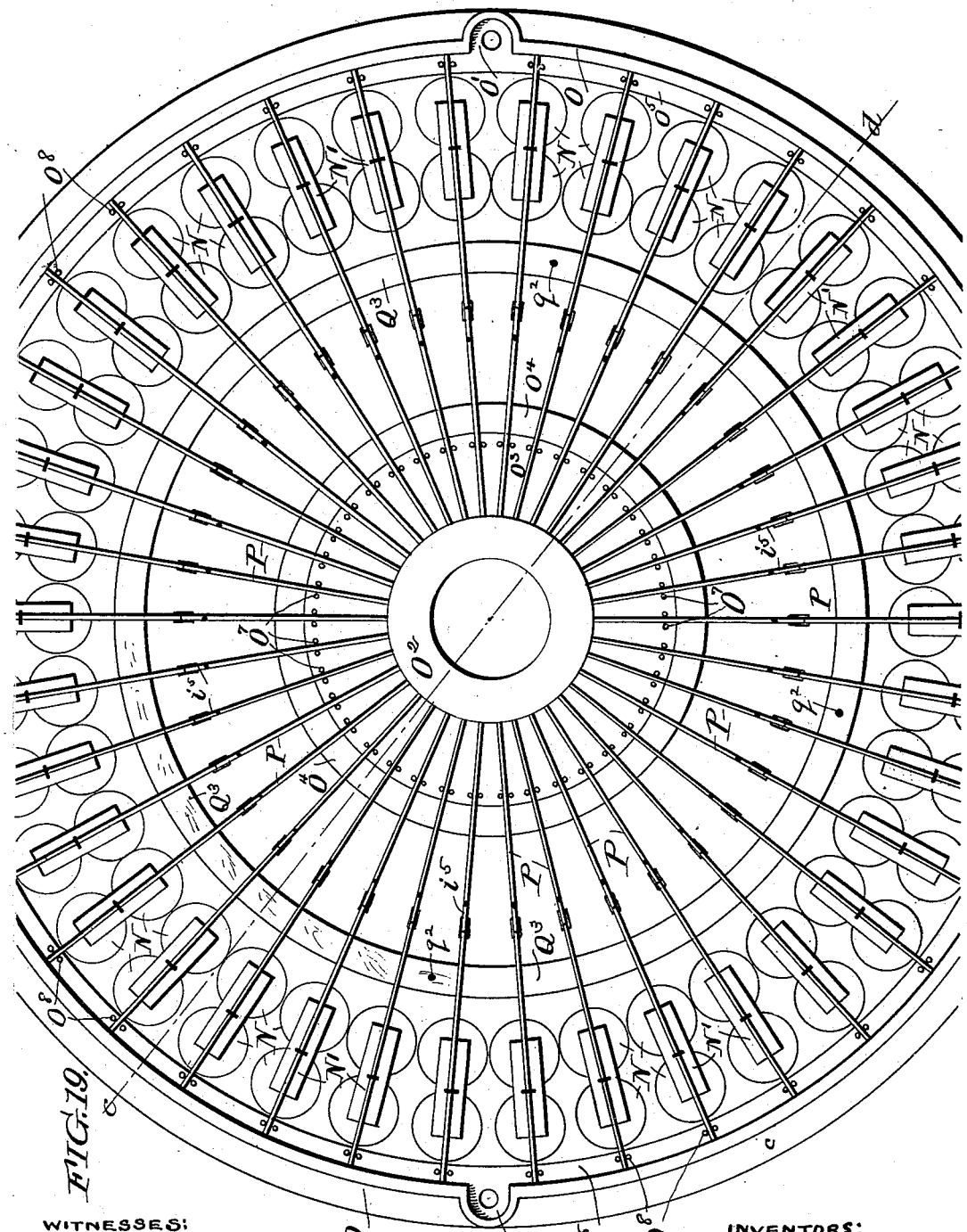

(No Model.) 8 Sheets—Sheet 8.

L. P. BUCK & F. D. SWEETEN.
PRINTING TELEGRAPH.

No. 506,973. Patented Oct. 17, 1893.

UNITED STATES PATENT OFFICE.

LEWIS P. BUCK AND FRANK D. SWEETEN, OF WILMINGTON, DELAWARE.

PRINTING-TELEGRAPH.

SPECIFICATION forming part of Letters Patent No. 506,973, dated October 17, 1893.

Application filed July 26, 1892. Serial No. 441,311. (No model.)

*To all whom it may concern:*

Be it known that we, LEWIS P. BUCK and FRANK D. SWEETEN, of Wilmington, county of New Castle, State of Delaware, have invented a certain new and useful Printing-Telegraph, of which the following is a true and exact description, reference being had to the accompanying drawings, which form a part of this specification.

Our invention relates to printing telegraphs, and has for its object to connect a transmitting key-board with a receiving typewriter in such a way that the receiving machine will be under the complete control of the transmitting operator. Preferably the transmitting key-board is the key-board of an ordinary typewriter, in which case our invention is of such a character that the movement of the two typewriters are synchronous.

The nature of our improvements will be best understood as described in connection with the drawings in which it is illustrated, and in which—

Figure 15:
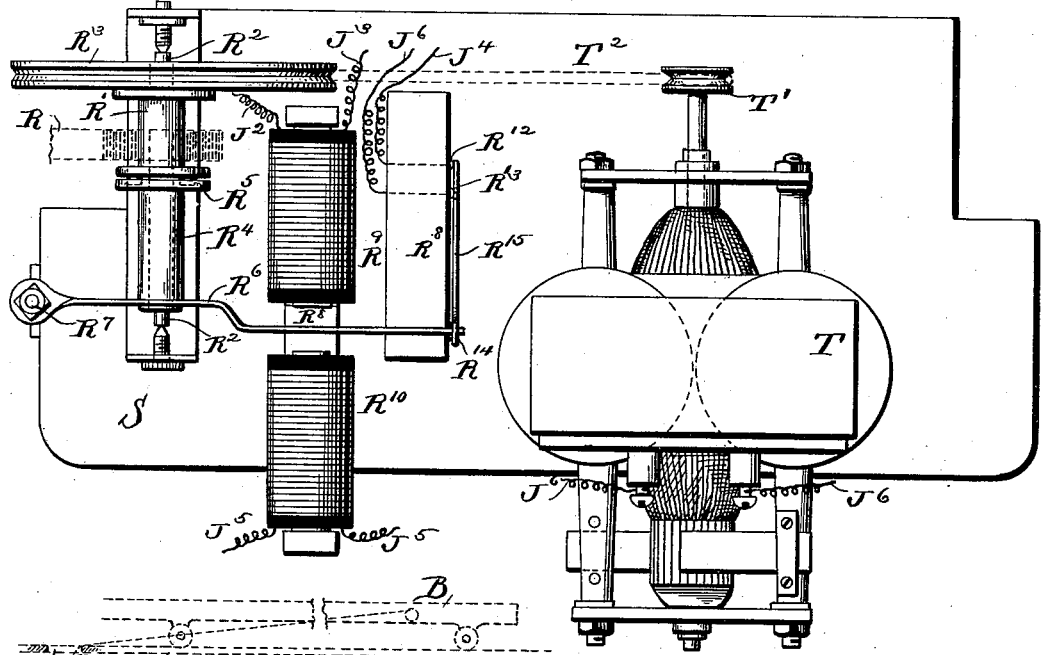
Figure 16:
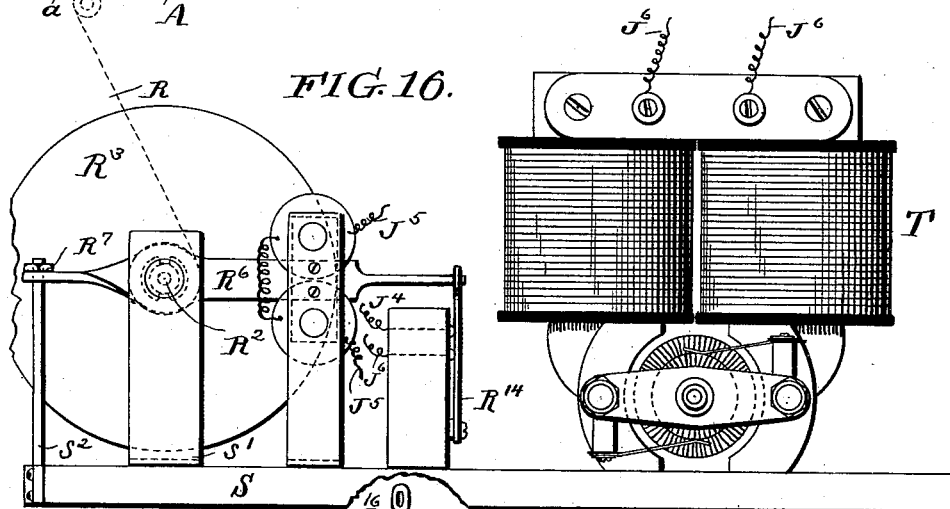
Figure 17:
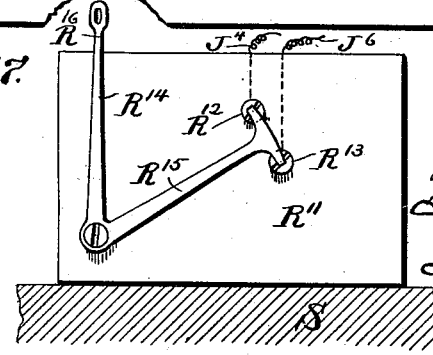
Figure 22:
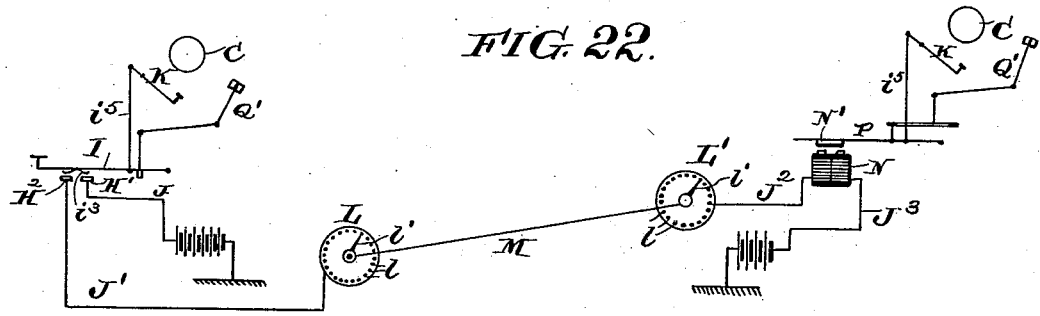
Figure 23:
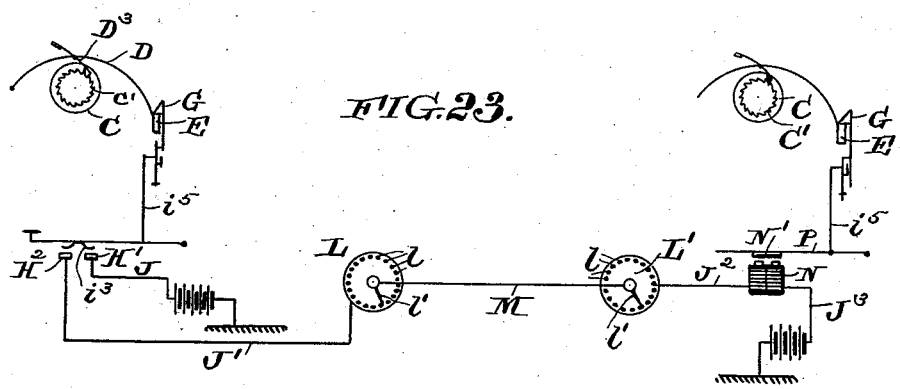

Figure 1 is a plan view of a Remington typewriter showing some of the modifications we make in such a machine to adapt it for our purpose. Fig. 2 is an elevation on a larger scale showing the mechanism by which the platen is operated. Fig. 3 illustrates another part of the mechanism which acts upon the platen to effect a proper feed in the paper. Fig. 4 is a plan view of the key-board of the transmitting machine with the keys in place; Fig. 5 a plan view of the key-board with the keys removed; Fig. 6 a longitudinal section through the key-board taken on the line A—B— of Fig. 4. Fig. 7 is a plan view of the typewriter on a small scale showing a practical arrangement in connection therewith of the device for drawing back the carriage to begin a new line of writing. Fig. 8 represents a pair of synchronously acting distributers connected together by an electric connection; Fig. 9 a perspective showing the well-known feed dog of the Remington typewriter. Fig. 10 shows a device for cutting off paper at convenient intervals. Fig. 11 is a front view, and Fig. 12 a side view of the paper holding device which we employ. Fig. 13 is a side view, and Fig. 14 an end view of a device employed by us for stopping the backward motion of the carriage at a proper time. Fig. 15 is a plan view of the mechanism for drawing back the carriage; Fig. 16 an elevation of the same device. Fig. 17 is a switch and its actuating mechanism by which the motor is connected and disconnected. Fig. 18 is an elevation showing the receiving typewriter; Fig. 19 a plan view of the base plate which holds the electromagnets, &c., acting upon the receiving typewriter; Fig. 20 a cross-sectional view taken on the line $c$—$d$ of Fig. 19; Fig. 21, a perspective view illustrating the device for actuating the feed-dog on the receiving machine; Fig. 22, a diagram showing the connection between the type bars of the receiving and transmitting machines; Fig. 23 a diagram showing the connection between the devices for feeding the paper in the two machines, and Fig. 24 a diagram showing the connection between the devices for moving back the carriage in the two machines.

A indicates the frame of the typewriter; B the carriage upon which the platen C is supported in the usual way. As shown in the drawings, these devices are of the usual Remington type, except as we use but one set of type; we have omitted the mechanism by which the carriage is shifted to bring the different type into operation. Ratchet wheels C' are secured to the platen shaft in the usual way, and the lever D pivoted at $C^3$ and provided with a pawl $D^3$ is arranged in the usual way for turning the platen to effect the necessary feeding of the paper. This lever is provided with springs D' and $D^2$ of the usual character, and its motion is regulated also in the usual way by means of a stop $B^2$ secured on a projection B' from the carriage. It will be noticed, however, that we prolong the free ends of the levers D and connect the two levers which we use at each end of the platen with a cross bar E, and it is by acting upon this cross bar that we operate the levers D and turn the platen. The bar E is supported at a proper height by means of a spring F secured in an arm $B^3$ extending out from the carriage B, and it is normally engaged by a snap hook G which extends upward through an opening in the frame, and is attached to a lever arm $G^2$ by means of a swivel joint as indicated at G', Figs. 3 and 18. A prolongation of the shank of the snap hook is connected with the spring arm $G^6$ extending down from the lever $G^2$. Said lever $G^2$ is pivoted at $G^3$ to an extension of the frame of the machine, and it is sustained in position by means of the spring $G^4$, and prevented from moving too far backward by means of a stop $G^5$ which comes in contact with the frame A. A link $i^5$ connects the lever $G^2$ with one of the actuating or key levers of the machine; for instance, with the lever marked $I^2$ in Fig. 4, and with a corresponding lever P in the receiving machine indicated in Figs. 18, 19 and 20. It is of course apparent that the depression of the appropriate key in either machine will draw down the bar E through the devices above described and effect the necessary feed of the paper on the platen. It is also evident that if the carriage be drawn up the snap hook will simply loosen its hold on the bar, while if the carriage is returned to its normal position on the frame the snap hook will take hold of the bar and be ready for operation.

H indicates the base plate of the transmitting key-board, and as shown it is provided with a conducting contact plate H′ extending along beneath the keys indicated at I I, &c., and with a series of contact plates $H^2$ $H^2$, one of which is situated beneath each key. The keys I which are of the usual kind used in the typewriter and are connected with the type levers in the usual way are each provided with a contact spring $i^3$, which, when the key is depressed, rests upon the plate H′ and the appropriate plate $H^2$, placing them in electrical connection. Obviously the contact plate for the key may be in permanent connection with the plate H′.

Figure 24:
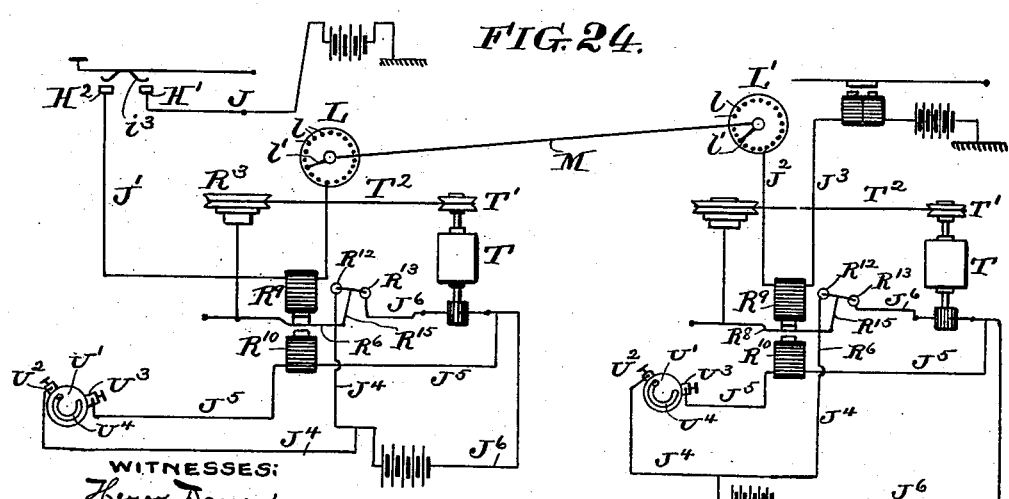

The plate H′ is in direct connection with a battery as indicated in the diagrams Figs. 22, 23, and 24, and each of the plates $H^2$ are in electrical connection with a contact plate in a distributer L, which may be of any convenient construction, that illustrated in the drawings showing a series of contact plates $l$ $l$, &c., a revolving needle or brush $l'$ which comes in contact with each of the plates $l$ in turn and which is connected permanently with the wire M.

The distributer L connected as above described with the transmitting key-board is connected in turn with a synchronous distributer L′, the wire M connecting with the revolving brush $l'$ of said distributer, and this brush revolving at the same time with the brush in the distributer L is always in contact with a corresponding contact point $l$. The contact points $l$ of the distributer L′ are connected by a series of wires $J^2$ with a corresponding series of electro-magnets N, through which magnets the current transmitted from the battery at the transmitting end passes to the ground as shown, and as we prefer to construct it the magnets N are placed in a circle in a base plate or frame O to the center of which a series of levers P are pivoted, one of such levers extending over each of the electro-magnets N, and being provided with an armature plate N′ immediately above the magnet. The levers P are each connected by rods or wires $i^5$ with type bars or other devices corresponding exactly with those upon the transmitting machine; and it will readily be seen that by the device above described, the motion of any one of levers in the transmitting machine effects a corresponding motion in the lever P of the receiving machine.

In the particular construction shown the base O (see Figs. 18, 19 and 20) is formed with an annular flange $O^2$ at its center and annular flange $O^{10}$ at its periphery. A hub $O^3$ is secured at the center below flange $O^2$, and a rim $O^5$ secured at the periphery below the flange $O^{10}$. A series of springs $O^6$ are secured to the hub by means of a clamping ring $O^4$, and a series of guide pins $O^7$ and $O^8$ extend upward from the hub $O^3$ and the ring $O^5$ respectively. The levers P are notched at P′ to form a fulcrum which is engaged by a flange from rim $O^5$; they each rest upon one of the springs $O^6$ and are aligned by passing between the guide pins $O^7$ and $O^8$, the rim $O^5$ preventing them from moving upward too far under the influence of their spring. A ring $Q^3$ is situated beneath the levers P and in contact with them. This ring being suspended by cords or rods $q^2$ from a ring $q'$, which ring in turn is suspended as indicated in Fig. 21 from the feed dog lever Q′ of the receiving typewriter, the mechanism is in substance the same as the familiar feed dog mechanism of the Remington typewriter as indicated in Fig. 9, as will be seen by comparing Figs. 9 and 21; by this construction the downward motion of any one of the levers P actuates the feed dog just as the downward motion of any of the keys in the transmitting key board actuates the feed dog in the transmitting machine.

In machines of this kind it is necessary that the platen should be fed from a roll of paper, and we accordingly secure a roll holder as indicated at V $V^2$, to the back of the carriage, this holder or frame being secured in place by pins V′ extending through openings or holes in the carriage frame as indicated in Fig. 1. Slotted openings $V^3$ are formed in the ends of the uprights V of the frame to receive the ends of a paper holding roll $V^4$, and to prevent the paper from reeling off too fast a disk $V^6$ is secured to one or both of the ends of the roll shaft, and the spring $V^7$ secured to the uprights V rests against the disk and serves as a friction brake. The paper indicated at $V^5$ passes under the platen C in the usual way (see Fig. 12) and is then led beneath the knife W′, which knife, as indicated in Fig. 10, is secured at a little distance above a cross bar $W^2$ which in turn is secured to the front of the carriage. The operator by taking hold of the paper and drawing it sharply against the edge of the knife can cut it off at any time.

It is of course necessary that the operator should be able to draw back the carriage at the end of each line. To enable him to do this we attach a strap R (see Figs. 1 and 15) to the carriage, this strap passing downward through an opening $a$ in the frame and being attached to a drum R'. This drum is operatively connected with an electric motor such as is indicated at T, and the motor is brought into operation by shifting a switch so as to connect it with a battery. This connection is effected by the action of a proper key in the transmitting key-board which is communicated through the distributing mechanism described to a corresponding key on the receiving side, which key is connected with the switch for engaging the motor of the receiving typewriter. The motor once set in operation will continue to act upon the drum drawing the carriage back by means of the strap attached thereto until the carriage has reached the proper position, and we then disconnect the motor by mechanism operated by means of the carriage which, at the proper time, acts upon the switch and cuts out the motor. Our preferred mechanism for accomplishing these results is indicated in Figs. 15, 16, 17 and 24. The drum R' is journaled on a shaft $R^2$, and which shaft is attached to pulley wheel $R^3$ connected by a belt $T^2$ with a pulley T' on the armature shaft of the motor T. A sleeve $R^4$ keyed to the shaft $R^2$ is provided at one end with a clutch $R^5$ adapted to engage the drum R'. The sleeve and clutch are free to move longitudinally upon the shaft $R^2$ and the sleeve is connected with a lever $R^6$ pivoted at $R^7$ and having its free end engaged with an arm $R^{16}$ of a pivoted lever $R^{14}$ $R^{15}$, having its free end $R^{15}$ so formed that when the clutch engages the drum R' it will connect two contact points $R^{12}$ and $R^{13}$, the point $R^{12}$ being connected with one pole of a battery through a wire $J^4$, while the contact point $R^{13}$ is connected to a wire $J^6$ with the motor T and with the other pole of the battery. By this construction it is apparent that the motor will be set in operation and will rotate the shaft $R^2$ whenever said shaft is engaged by means of the clutch $R^5$ with the drum R', while the disengagement of the clutch is always accompanied by the cutting out of the motor. The motion of the lever $R^6$ to accomplish these results is brought about by placing it between two electro-magnets $R^9$ and $R^{10}$, and providing it with an armature plate $R^8$ situated between the poles of those magnets. The magnet $R^9$ in the transmitting machine is connected with an appropriate contact point $H^2$ on the key-board by a wire J' which, after passing through the magnet, is continued to the distributer L. The current passes through the distributers, and from the distributer L' is transmitted through a wire $J^2$ to the corresponding magnet $J^9$ in the receiving instrument; thence through a wire $J^3$ the current passes to the ground. By this construction it is of course obvious that the motor in both the transmitting and receiving machines will be simultaneously engaged to draw back the carriage, and of course, if no typewriting machine be used in connection with the transmitting key-board the device remains the same, except, that the current is not passed through a magnet to the transmitting machine.

Now in order to disconnect the drum from the shaft $R^2$ and to cut out the motor in either or both machines, it is only necessary to pass a current through the magnet $R^{10}$ which acting on the armature $R^8$ will draw the lever $R^6$ forward disconnecting the clutch and shifting the swivel arm $R^{15}$ so as to disconnect the contact points $R^{12}$ and $R^{13}$. We accomplish this by securing a plate U' to the slide bar U upon which the carriage is secured; this plate is made of non-conducting material, is provided with a contact post $U^2$ with which a spring plate $U^4$ is in electrical connection, while a contact post $U^3$ is electrically connected when the spring $U^4$ is pushed down as it is by the end of the carriage when drawn back to its full extent (see Figs. 1, 13, 14 and 24). The post $U^2$ is in electrical connection with the battery and the post $U^3$ in electrical connection with the magnet $R^{10}$, and through it with the other pole of the battery; obviously then, when the posts $U^2$ and $U^3$ are connected a current is passed through the magnet $R^{10}$ with the desired results noted above.

Having now described our invention, what we claim as new, and desire to secure by Letters Patent, is—

1. The combination with a series of typewriter key levers I I, of a plate as H' connected to a source of electrical supply, a series of contact plates as $H^2$, spring contact plates $i^3$ attached to the key levers so arranged as to make electrical connections between the plate H' and a contact plate $H^2$ on the depression of a key lever, a distributer, a series of conductors leading from each contact plate $H^2$ to a series of contact points on the distributer, a second distributer having synchronous movement with the first, an electric conduit connecting the distributers and a recording instrument connected with the second distributer.

2. The combination with a series of typewriter key levers I connected with type bars in the usual way, of a plate as H' connected to a source of electrical supply a series of contact plates as $H^2$, spring contact plates $i^3$ attached to the key levers and so arranged as to make electrical connection between the plate H' and a contact plate $H^2$ on the depression of the key lever to which it is connected, a distributer, a series of conductors leading from such contact plate $H^2$ to a series of contact points on the distributer, a second distributer having synchronous movement with the first, an electric conduit connecting the distributers and a recording instrument connected with the second distributer substantially as specified.

3. The combination with a series of typewriter key levers I connected with type bars in the usual way, of a plate H' connected to a source of electrical supply, a series of contact plates as H², spring contact plates $i^3$ attached to the key levers and so arranged as to make electrical connection between the plate H' and a contact plate H² on the depression of the key lever to which it is connected, a distributer, a series of conductors leading from each contact plate H² to a series of contact points on the distributer, a second distributer having synchronous movement with the first, an electric conduit connecting the distributers, a series of electro-magnets N N, a series of pivoted levers P arranged above the magnets N and each carrying an armature N' and a typewriter the type bars of which are connected with and actuated by the levers P substantially as specified.

4. The combination with a typewriter having key levers I I, of a plate H' secured to the base of the machine and in connection with a source of electrical supply, a series of contact plates H² H² also secured to the base of the machine but insulated from the plate H', a series of spring contact plates $i^3$ secured to individual keys, and so arranged as to make electrical connection between the plate H' and a plate H² when a lever I is depressed and a series of conductors connected with each plate H².

5. The combination in a typewriter of ratchet wheels C', attached to the platen shaft, pivoted levers D D carrying pawls D' adapted to engage said ratchet and turn the platen, a bar E attached to the free ends of lever D, a spring arranged to hold bar E in its normally uppermost condition, a lever G² pivoted to the frame and sustained by a spring as G⁴, a snap hook G attached to end of lever G², as described, and arranged to engage bar E, and a key lever I² connected with lever G² as described.

6. The combination of two typewriters each having ratchet wheels C' attached to their platen shafts, pivoted levers D D carrying pawls D' adapted to engage said ratchets, bars E attached to the free ends of levers D, springs supporting said bars and levers, levers G² pivoted to the frame and sustained by springs, snap hooks G attached to each lever G² and adapted to engage the bars E, a key I² connected with the lever G² on the transmitting machine, a contact plate $i^3$ secured to said key, a source of electrical supply and a contact point as H' placed so as to be connected by plate $i^3$ when the key I² is depressed, connections between said plate H' and an electro-magnet adjacent to the receiving machine, a lever P connected to the lever G² of said machine, and an armature secured to said lever above the electro-magnet substantially as specified.

7. The combination with the receiving typewriter of the circular frame O having annular rims O² and O¹⁰, a hub O³ at its center and a rim O⁵ at its outer edge, a series of electro-magnets N N &c. arranged in a circle in said frame, a corresponding series of levers P pivoted on rim O², springs O⁶ arranged to hold the levers up against rims O² and O¹⁰ guides O⁷ and O⁸ arranged to preserve the alignment of said levers, armatures N' secured to each lever above the corresponding magnet, and connections from the levers to the type-bars of the machine.

8. In combination with a typewriter a frame V V² adapted to rest in the back of the carriage, and having journal bearings V³ and spring V⁷, and a paper roll V⁴ having a disk V⁶ adapted to press against spring V⁷.

9. In a typewriting machine substantially as described the combination with a frame as V V² adapted to carry a roll of paper above a platen; said platen against which the paper is carried and a stationary knife W supported on the front edge of the carriage below the platen and paper roll, all substantially as specified, and so that the operator at the front of the machine can tear off any length of paper required.

10. In a printing telegraph substantially as described an electric motor T connected with the carriage of a typewriter so as to draw it back when operated, a battery, a switch adapted to connect and disconnect the battery and motor, a key connected with the switch so as to actuate it to make such connection and means to actuate the carriage arranged to move the switch and cut out the motor when the carriage has moved back to the desired extent.

11. In a printing telegraph substantially as described two typewriters each provided with electric motors T so connected with the carriages as to draw them backward when in operation, batteries and switches adapted to connect and disconnect each motor therewith, levers connected with each switch so as to connect the batteries and motors when operated, synchronously acting distributers and connections through said distributers between the two levers as described and so that the movement of the lever in the transmitting machine effects a similar movement in the lever of the receiving machine, and means actuated by each carriage operating to move the switches and cut out the motor in each typewriter.

12. In a printing telegraph as described the combination with the carriage of a typewriter of a drum R', a band R connecting the drum and carriage, a shaft R² supporting the drum, a pulley R³ secured to shaft R², and clutches R⁵ also secured thereto and adapted to engage the shaft and drum, electro-magnets R⁹ R¹⁰, a lever R⁶ connected with clutch R⁵ and supporting an armature R⁸ situated between the magnets, a battery, a motor T, a switch R¹⁵ actuated by lever R⁶, and adapted to connect the battery and motor when the clutch is engaged with drum R', a pulley T' connected with pulley R³, a lever arranged when actuated to connect magnet R⁹ with a battery so as to actuate lever R⁶ to engage clutch $R^5$ and connect the motor, and a switch on the machine arranged in the path of the carriage adapted to connect a battery with magnet $R^{10}$ to disengage the clutch and motor.

13. The combination with the carriage B of a removable frame $V\ V^2$ adapted to carry a roll of paper above the platen and having downwardly extending pegs $v'$ adapted to enter perforations in the carriage.

LEWIS P. BUCK.
FRANK D. SWEETEN.

Witnesses:
FREDERICK W. NEUTZE,
S. H. BAYNARD.